United States Patent [19]
Kurtz et al.

[11] Patent Number: 5,608,395
[45] Date of Patent: Mar. 4, 1997

[54] SIMPLIFIED COMPUTER ACCESS SYSTEM

[75] Inventors: Isaac Kurtz, Downsview; Jutta Treviranus, Toronto, both of Canada

[73] Assignee: The Hugh MacMillan Rehabilitation Centre, Toronto, Canada

[21] Appl. No.: 264,139

[22] Filed: Jun. 22, 1994

[51] Int. Cl.$^6$ .................................................. H03M 11/00
[52] U.S. Cl. ............................... 341/50; 341/79; 341/66; 364/DIG. 1; 364/225.6; 364/234.4; 364/251.6
[58] Field of Search ................................. 341/50, 51, 67, 341/65, 66, 79; 364/DIG. 1, 419.03

[56] References Cited

U.S. PATENT DOCUMENTS

| | | | |
|---|---|---|---|
| 3,895,185 | 7/1975 | Ramsey | 341/66 |
| 4,381,502 | 4/1983 | Prame | 340/365 |
| 4,559,598 | 12/1985 | Goldwasser et al. | 364/419 |
| 4,642,610 | 2/1987 | Smith, III | 340/365 |
| 4,746,913 | 5/1988 | Volta | 340/706 |
| 5,051,745 | 9/1991 | Katz | 341/51 |
| 5,220,652 | 6/1993 | Rowley | 395/275 |

FOREIGN PATENT DOCUMENTS 1166441  10/1969  United Kingdom .

*Primary Examiner*—Howard L. Williams
*Attorney, Agent, or Firm*—Rothwell, Figg, Ernst & Kurz, P.C.

[57] ABSTRACT

A method of providing simplified keyed access to a computer or to other electronic devices with an alphabetic display, also referred to as a "computer", the method including the use of a low order hashing code for hashing the vocabulary in the computer, then using the same hashing code to hash-code a desired word that a user wishes the computer to display; entering the hash-coded word, and comparing the desired word with vocabulary words that conform to the code. To specify a desired word from among the vocabulary words that match the hash code, the vocabulary, or portions thereof, are preferably organized as a binary tree, having the words with highest frequency of use located highest in the tree. Where a binary hashing code is used, then the alphabet is approximately halved, such as at the letter N, and a simple key code such as a Dot can be used to denote all letters in the group A through M, and a Dash can be used to denote all letters in the group N through Z. A third code element, namely a Pause, may be used to signal termination of the hash-code input. This reduces keying effort required of a user in entering a desired word in hash-code to a minimum. Extension of the method to tertiary or quaternary hash-coding makes both the coding of a desired word and its keyed entry into the computer somewhat more difficult, but can significantly speed up the word matching process, as the rate of vocabulary discard by the computer in organizing the Words matching the input code, is progressively increased. A Dot/Dash or other simple binary code may be used to "steer" the computer through the binary tree, in making the match, and a third key code, which may comprise a signalling Pause, may be used to select the desired tree item.

18 Claims, 1 Drawing Sheet

5,608,395

SIMPLIFIED COMPUTER ACCESS SYSTEM

TECHNICAL FIELD

This invention is directed to a simplified method for accessing a computer, and to an apparatus for providing such simplified computer access.

BACKGROUND TO THE INVENTION

Computers have been adapted for a multiplicity of uses, from the storing and manipulation of data, including the performance of complex mathematical operations, to use as a word processor, and as a means of communication for the handicapped.

In this latter field it has been found that autistic people appear to derive great benefit in enhancing their ability to communicate with others, through the medium of a computer, while in the case of the physically handicapped access to a computer keyboard by various assisting devices has vastly enhanced both the ability to communicate, and the capability of accessing other services that a computer can provide.

Examples of such prior art use, primarily of computers, and ways of enhancing access to, and the utilization of devices such as computers can be found in the following listed patents, among others:

U.S. Pat. No. 3,895,185, Ramsey, July 1975

U.S. Pat. No. 4,381,502, Prame, April 1983

U.S. Pat. No. 4,559,598, Goldwasser et al., December 1985

U.S. Pat. No. 4,642,610, Smith, February 1987

U.S. Pat. No. 4,746,913, Volta, May 1988

U.S. Pat. No. 5,051,745, Katz, September 1991

U.K. Patent No. 1,166,441, Lewin et al., October 1969

U.S. Pat. No. 5,220,652, Rowley, June 1993

Ramsey (U.S. '185) provides circuitry for complex dot-dash generation, recognition and organization; requiring two keys or switches to enable their simultaneous use; also a 63-character tree counter is provided.

Alphabetical character access has been simplified by Prame (U.S. '502), requiring the use of two keys; the Goldwasser et al. (U.S. '598) has accessed screened text, by pointing to desired portions of text with a pointer, to effect selection; Smith (U.S. '610) provides two-rate character scanning; Volta (U.S. '913) provides a variable modulated "ability" control; Katz (U.S. '745) teaches a method of string element searching, using hashed text; Rowley (U.S. Pat. No. '652) provides a complex word selection system involving a binary search technique to navigate a vocabulary list requiring four switches in separated relation, or a single, strobing control switch, with associated adverse time requirements both of user and computer. The '652 binary search is based upon presentation as the first word of a binary tree being approximately the middle word of the alphabetical order, regardless of frequency of use of that word. Lewin et al. (U.K. '441) teaches the use of a recording tape deck with a control key and a recording key.

These prior art arrangements are generally relatively slow in operation, and usually require the capability of operating a plurality of keys.

In the matter of hashing text, this may be done mathematically, giving each letter of the alphabet its own unique numerical value, and then summing the total value of a word, which is then input into the computer. In view of the existence of 26 letters in the alphabet, the coding arithmetic is time-consuming, and if carried out mentally, as would be the case for a severely handicapped user, could readily lead to errors. Furthermore, each word constitutes but a single entry, for purposes of carrying out comparisons.

SUMMARY OF THE INVENTION

The present invention provides a method of achieving simplified access to a computer program containing a vocabulary of words or terms, including effecting a progressive reduction in the size of the eligible vocabulary by the steps of hashing the individual terms of the vocabulary to a predetermined reduction hashing code, progressively hashing succeeding letters representative of a desired word with the predetermined hashing code; successively inputting the hash coded letters of the word input the computer; and selecting the desired word from amongst the words conforming to the entered hashing code, wherein the hashing code is at least a binary code, enabling entry thereof by a single switch/key.

The step of specifying the desired word may be accomplished by direct selection using a pointing device, or by automated voice recognition, or by use of a technique comprising viewing words according to the input code, as sequentially displayed by the computer in response to the input; commanding the computer to display a further sequential word from the vocabulary; repeating if necessary the reviewing step; and commanding further word display, until the desired word is displayed.

The aforesaid reduction hashing code comprises an alphabetical code wherein the letters of the alphabet are grouped into a small number of groups, such as two, three or four groups; wherein each group is assigned a simple input symbol.

In a preferred embodiment a mere two groups are employed, and the alphabet is divided arbitrarily at a set point, such as the letter N, as discussed below, for a binary code.

The present invention further provides a simplified access method wherein the hashing code is a binary code, to facilitate ready hashing of a desired word.

In a preferred method having the hashing code comprised of a binary alphabetic code, the alphabet is arbitrarily divided into two portions at a "set point" letter such as "N" (In the following explanation the capitalized letters of the alphabet will be used, in order to obviate where possible the continuing use of quotation marks).

With N selected as the set point, all letters coming before N, viz A through M, are given a first hashing signal that can readily be inputted to the computer, such as a Dot or a Dash.

The remaining or complementary portion of the alphabet, the letters N through Z are given a second hashing signal, such as a Dash or a Dot.

This simple hashing code can be readily input into the computer in the fashion of using a single code-input key.

In the case of a user who is capable of operating two input keys, then a first key can be dedicated to inputting a first hash code signal, and the second key can be dedicated to inputting the second one of the hashing code signals.

A Pause or a third dedicated key may be used to signal that the hashing code input for a desired word has been completed.

For the purposes of the present invention such operation using two keys will be treated as inputting a first or a second hashing code signal, which in the case of a user using a single key may be carried out by a short-term key depression, as constituting a Dot, and longer term key depression as constituting a Dash.

It is noted that for a binary coded vocabulary the entry of a first one of the binary hash symbols for the first letter of a desired word effectively causes the discard of 50% of the words of the vocabulary, due to the fact that 50% of the words (on the average) will have their first letter coded with the other one of the binary coding signals.

Similarly, in the case of the entry of the next hash code for the second letter of the desired word, there will be a discard of sensibly one half of the remaining words of the vocabulary.

Thus, a 4-digit (hash symbol) binary word entry will generally (on average) at least result in reducing the potential vocabulary to 1/16th of the original number of words.

In a preferred method the entry of a 4-digit code followed by a Pause (or a Stop key operation) will further reduce the vocabulary to comprise 4-letter words only.

Similarly, any explicit code entry for an "n" letter code will reduce the vocabulary by a factor of 2n and also will limit the search to words having only n-letters.

In one embodiment of the invention, following hashing, to facilitate selection of the desired word from amongst the words that conform to the input code, the conforming words of the vocabulary may be arranged in a binary tree, preferably positioning those words with a higher frequency of use at a higher location in the tree.

This embodiment takes advantage of the fact that an alphabetically organized binary tree can also be organized vertically according to the frequency of use, by sorting the words, while maintaining lateral (horizontal) alphabetic organization.

The presentation of a group of words in a binary tree, in response to an input hash code for a desired word then enables the user to "steer" the computer, by moving from a highlighted word in a selected "direction".

Thus, in the case of a user having a Dot or a Dash input capability, in comparing the desired word with a highlighted word presented by the computer as a possible selection, the presented word may be compared alphabetically with the desired word, and if the desired word is "lower" in the alphabet than the presented, highlighted word, then as a for-instance, a Dot can be input as a signal commanding the computer to move alphabetically lower to another word in the binary tree that is alphabetically "lower" than the presently highlighted word.

In this manner, a single input key can be used to steer the computer to "move up" or to "move down" alphabetically, by selectively inputting a Dot or a Dash command. Upon the presentation by the computer of the desired word, the user, by actuation of a third key or by a Pause in giving steering commands, thus constituting a "O" command input, can cause the computer to 'save' the word, and to present it, possibly as one more word in a message sequence.

The input by a user of a desired word in its binary alphabetical code, symbol by succeeding symbol, enables programming of the computer so as to present a potential word in response to each symbol input, moving sequentially from word to word as the word input progresses.

As discussed above, this symbol-by-symbol input of a desired word has the effect, at each key stroke, of significantly and progressively reducing the size of the vocabulary of still-qualified words, so that the presentation of a potential word after each symbol is input also gets progressively more relevant.

Thus it will be seen that whereas in the usual operation of a computer in carrying out a search the comparison of an input term with the computer memory is effected by the computer, in the present system the computer presents words from an available coded field of words, which conform with the coded input, so that the user makes a comparison with, and also the selection of the desired word.

As an example, assuming that the simplest form of hashing signals, namely a dot and a dash have been adopted for hashing both the vocabulary and a desired word when accessing the computer, then each letter of the alphabet is assigned either a Dot or a Dash, as described above. If letters A through M are coded as a DOT (.), then letters N through Z are coded as a DASH (-).

Then "and" would encode as (.-.); in a non-tree vocabulary, with the desired word entered in hash code, upon the user pausing after making the entry the computer would then present all words conforming to that code, from which the user could then select the desired word as it was presented on the screen.

In the event that there is only one word n the vocabulary to fit the code for the desired word, then that word will be presented, possibly even before entry is completed. If no word is present in the vocabulary that conforms with the entered code, then the computer may be programmed to present the most commonly used word that commences with that entered code.

As another instance, the words "A" and "I" both encode as (.). However, if there is no word that encodes (-), upon entry of an initial code (-) the computer can present the most commonly used word from the vocabulary having the initial letter N through Z. Should the user pause at that juncture in their entering of the code, then the presented word is entered into the message, but if there is no such pause, and entry of the code continues, then the presented word is superseded by a further word in accordance with the updated code entry.

It will be understood that the hashing code that is adopted must be strictly adhered to in order to achieve the desired results. Thus, by adopting N as the alphabetical set point, if the first letter group is to be A through M, and the second group N through Z, then the set point letter (in this case N) must not migrate from one group to the other group.

The selection of Dot or Dash to represent A-M or N-Z is entirely arbitrary, as also is the selection of the "steering convention", when directing word selection within the binary tree.

Also, of course, the set point letter can be virtually any letter in the alphabet, so long as consistency is maintained. Statistically, the mid-point of frequency of use is the ideal set point, in the case of a binary hashing code.

The expansion of an existing vocabulary within a computer in order to encompass specialty words of the user may be readily accomplished by use of the key or keys in morse or other like code, to input the desired data to computer memory, within the vocabulary.

Furthermore, specialty sets of vocabularies may be used for different types of work, so as to provide desired specialization and also to reasonably limit the size of the respective vocabularies, so as to enhance word accessability.

The present invention thus provides apparatus comprising a computer in combination with or containing a vocabulary alphabetically hashed to a limited number of input symbols, and key means for inputting the input symbols.

The key means may comprise a dedicated key of a keyboard, or any other signalling device capable of use by the user for inputting the desired symbols, including one or more of the same or like keys for inputting Dot and/or Dash signals and/or a termination signal.

The subject apparatus may further arrange the vocabulary or any part of the vocabulary, conforming to a specific input hashed code, by way of a binary tree, with words of a greater frequency of use located higher up in the tree.

The computer may be programmed to respond with a display of a highlighted word from the aforesaid vocabulary, in response to each symbol, as it is input.

The program may further include the capability to respond in an alphabetical sense when commanded to proceed to another word, from a highlighted word, in a direction towards a word located higher or lower in the alphabetical order, within the binary tree, in accordance with an input command.

The subject program may be used as a supplemental access program in combination with an existing program such as a word processor program.

The input signalling means may comprise a key of an existing keyboard connected with a computer, a control mouse, or any suitable form of signalling device that can be operated by the user, i.e. the simplest form of ability switch giving a specified user the capability of sending three symbols, such as a Dot or Dots, a Dash or Dashes, or a Pause in key actuation, or combinations thereof.

In the preferred embodiment, three keys may be used, each dedicated to its respective symbol signal, such as Dot, Dash and Pause (termination of input) or other preferred symbol.

The input key or keys may be connected serially or to a parallel port or ports of the computer.

In addition to use by handicapped users, the present system also lends itself to use by persons having only one hand available for the task of accessing the computer.

Statistically, there is a high probability that for a large vocabulary the binary tree will be approximately balanced; i.e. there will be approximately an equal number of nodes to the right and to the left of the root word. This can mean that the number of comparisons (and consequent steering command entries) required to find a desired word entered in hash code will usually not exceed log-to-base-2) X (number of words in the vocabulary).

Thus, for an 8,000 word vocabulary an average of 13 steering command entries (such as dots and dashes) should bring up any one of the less common words, while the 200 or so most common words would require an average of 8 steering command entries.

When the binary tree technique is combined with hashing the qualified vocabulary segment is significantly reduced and the total number of words from the vocabulary available for selection is further reduced, since the search is limited to the number of code entries made, i.e. is limited to words of n and n-letters, where n and n is the number of entries made in the hash code.

It will be understood that the present invention may be extended to a larger number of hash groupings, as certain advantages accrue in adopting a 3-group or a 4-group hashing base, in that the vocabulary reduction effect is correspondingly multiplied. As a for-instance, single-key tertiary code entries might comprise (.); (..); and (-); with the alphabet arbitrarily divided into groups such as A–H; I–P; and Q–Z.

A 4-group base might be coded (.); (..); (.-) and (-); and the alphabet might be arbitrarily divided into A–F; G–L; M–R; and S–Z, respectively, for each of the four codes.

It will be appreciated that a 3-group base will result in an approximate 66% vocabulary discard with each entered symbol; while a 4-group base will result in an approximate 75% vocabulary discard with each entered symbol.

The choice of binary, tertiary or quaternary grouping may be based upon the capability of the user, both in hash coding the desired words or terms, and in physically entering the necessary code symbols for the hashed (desired) word or term.

BRIEF DESCRIPTION OF THE DRAWINGS

Certain embodiments of the invention are described by way of example, without limitation of the invention thereto other than by way of the following claims, reference being made to the accompanying drawings, wherein:

DESCRIPTION OF THE PREFERRED EMBODIMENT

Figure 1:
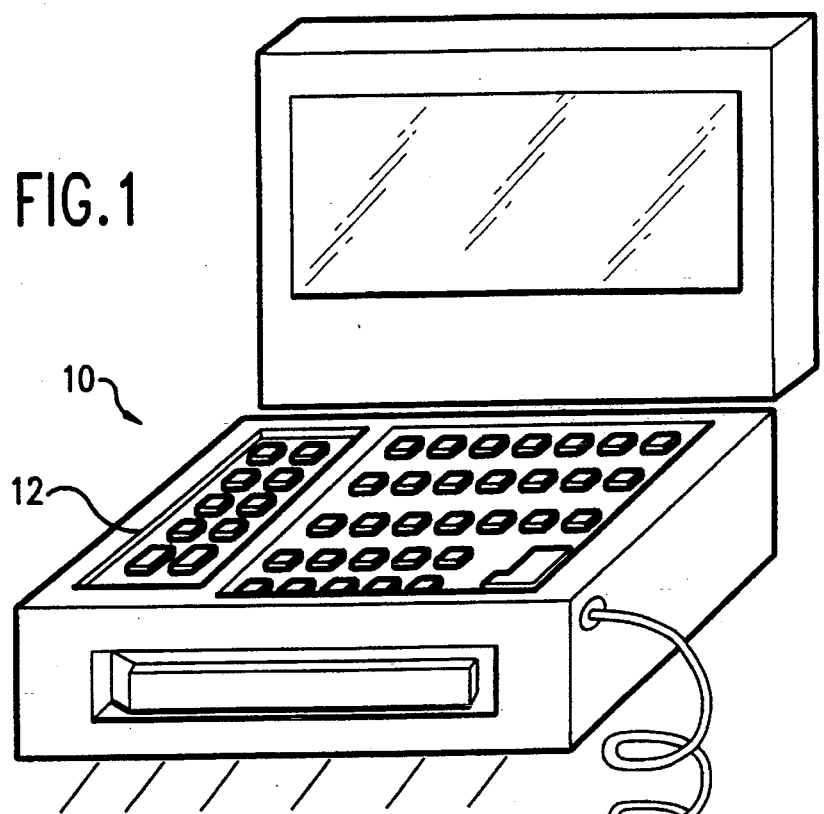
FIG. 1 is a schematic view of a computer apparatus with a signalling switch for carrying out the invention.

Referring to FIG. 1, a computer 10, illustrated as being a portable lap-top, is shown with a keyboard 12.

A single input key 14 is illustrated, connected to the keyboard 12, and being illustrated as the morse type.

However, it will be understood that other types of keying arrangements can be used, as referred to above.

The computer 10 may have a built-in word processor, or a program such as Word Perfect 5.1 (Trademark), together with a supplemental access program in accordance with the present invention, and including a hash-coded vocabulary, coded in accordance with an alphabetical set point, and hashing code symbols and tree steering symbols adopted for the system.

Figure 2:
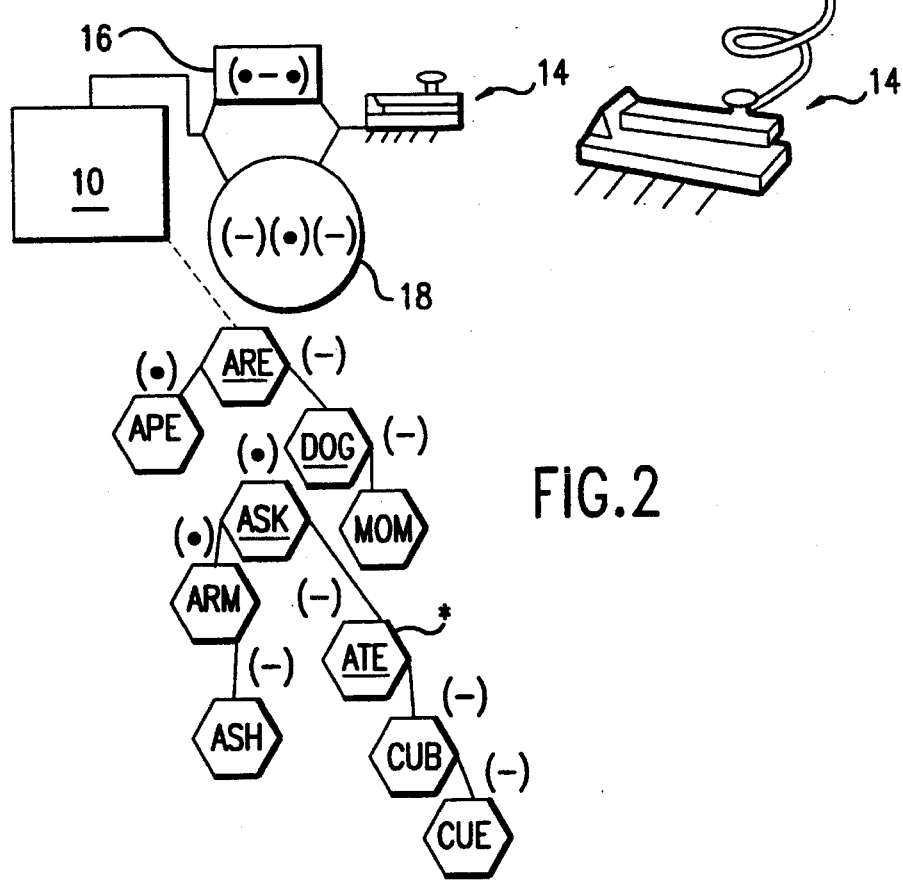
FIG. 2 is a portion of a binary tree showing some sample words and associated word-path commands for the hash code ...(.-.).

Referring to FIG. 2, the binary tree illustrated shows what might be presented by the computer as a consequence of entering the hashing code 16 for the desired word "ate", which could hash as ...(.-.). The tree shows a node word "are", which has been deemed to be the most probable word conforming with the input hash code. In the vocabulary, this then branches to "ape", and to "dog". "Dog" then branches to "ask" and to "mom"; and the word "ask" branches to "arm" and "ate"; the word "ate" branches to "cub", which branches to "cue".

Shown circled and asterisked is the desired word "ate", whose vertical position in the tree is based on its probability of use relative to its proceeding words or 'ancestors', "dog" and "ask" and "are".

With the responsive node word illustrated as "are", the user enters a steering command 18, a Dash (-), indicating the computer should move "up" in its word selection "towards Z", or Z-wards, because the desired word is alphabetically "above" or "greater than" the node word. The command Dash is illustrated in a bracket adjacent the leftwards directed node connecting line.

This steering command leads to the computer showing the highlighted word "dog". The word is underlined, to illustrate the highlighting thereof.

The word "dog" is "above" or alphabetically "greater than" the desired word "ate", so the steering command is a Dot (.), a command to "go lower".

The computer highlights "ask" from the tree, (shown underlined) to which the user responds with a Dash (-) command, indicating that the word is too low, alphabetically, and causing the computer to go "higher", thereby highlighting "ate", (again underlined, encircled and asterisked).

This is the desired word, so the user does not respond, and the computer interprets the pause as a command ... 0 ..., and adds the desired word "ate" to an existing message portion, or to storage.

What is claimed:

1. The method of providing simplified access to a computer program containing a vocabulary of words or terms, said vocabulary having a predetermined arrangement based on two separate parameters, including effecting a progressive reduction in the size of the eligible vocabulary by the steps of hashing the vocabulary with a predetermined reduction hashing code; progressively hashing succeeding letters representative of a desired word with the predetermined hashing code; successively entering the hash-coded letters of the word as inputs into the computer; and selecting the desired word from amongst the words conforming to the entered hashing code, wherein said hashing code is at least a binary code, enabling entry thereof by a single switch/key.

2. The method as set forth in claim 1, said reduction hashing code comprising dividing the alphabet into a small number of two or more groups of letters; each said group of letters being represented, respectively by a simple code for input into said computer.

3. The method as set forth in claim 2, said hashing code being a binary code having a pair of simple symbols, each representing two groups of letters comprising all of the letters of the alphabet.

4. The method as set forth in claim 3, wherein said hashing code is a variable length code, the termination thereof being signified by an entry selected from the group consisting of a keying pause and use of a dedicated entry key.

5. The method as set forth in claim 2, wherein said hashing code is a variable length code, the termination of input thereof being signified by an entry selected from the group consisting of a signalling pause and the use of a dedicated entry signal.

6. The method as set forth in claim 5, wherein the length of said variable length code is the same as the length of said desired word.

7. The method as set forth in claim 2, said hashing code being a tertiary code having three simple symbols representing three groups of letters comprising in total the letters of the alphabet.

8. The method as set forth in claim 4, wherein said hashing code is a variable length code, the termination thereof being signified by an entry selected from the group consisting of a keying pause and use of a dedicated entry key.

9. The method as set forth in claim 2, said hashing code being a quaternary code having four simple symbols representing four groups of letters comprising in total the letters of the alphabet.

10. The method as set forth in claim 1, wherein the step of selecting said desired word from amongst the words of the vocabulary that conform to said input hashing code comprises reviewing and making alphabetical comparison between said desired word and a vocabulary word presented by said computer, selected from words conforming with said hashing code and arranged as a binary tree having words with greater frequency of use entered higher upon the tree and having their lateral arrangement in accordance with their respective alphabetic sequence; and commanding the computer by way of said single switch/key to present another word by the input of a binary steering command to proceed to a word of desired higher or lower alphabetical order than the word being reviewed, in accordance with said comparison.

11. The method of providing simplified access to a computer containing a vocabulary of words, said words being presented in the sequences of a binary tree, the tree having words with a greater frequency of use entered higher up on the tree with words entered as nodes of the tree by respective dependent/child links, with lateral arrangement between equivalent child nodes being dependant upon the respective alphabetical order, such that words that are alphabetically lower are assigned to a first child node position, and words that are alphabetically higher are assigned to the opposite child node, whereby the height location of a word in the tree is controlled by the relative frequency of use of that word, while the lateral organization of the tree is alphabetic, gaining said access, in use, by commanding the computer to proceed from the root word downwardly to a selected one of the daughter nodes by way of entering a steering command into the computer to select a word of a higher or a lower alphabetical order than that of the word being considered in relation to a desired word.

12. The method as set forth in claim 11, said steering command being one of a pair of binary commands.

13. The method as set forth in claim 11, said binary commands being selected from the group consisting of a Dot, and a Dash, and combinations thereof.

14. Apparatus requiring minimal physical actions for speechless communication, comprising a computer having a predetermined vocabulary in the memory thereof; said vocabulary having a predetermined arrangement based on two separate parameters, said vocabulary being code-accessed by successive predetermined simple reduction hashing code signals, each representative of a letter of said word; a single switch/key signal input means connected to said computer enabling a user to successively input said simple signals to the computer in the code, representing a portion of the vocabulary that includes the desired word; said computer being programmed to respond to said input signals to display said vocabulary portion in accordance with the coded input.

15. The apparatus as set forth in claim 14, said vocabulary portion words being organized in binary tree sequence, in accordance with words having greater frequency of use being arranged higher upon the tree for earlier presentation, in use, than words having lower frequency of use; with words entered as nodes of the tree of respective dependent/child links, with lateral arrangement between equivalent child nodes being dependent upon their respective alphabetic order.

16. The apparatus as set forth in claim 14, said single switch/key signal input means comprising an ability switch for actuation by a user to transmit a binary signal.

17. The apparatus as set forth in claim 16, said ability switch comprising a simple make-and-break switch capable of selectively transmitting Dots and Dashes.

18. The apparatus as set forth in claim 17, said computer being programmed to respond to a zero command signalling that signal input for the desired word is terminated, said zero command being input as a signal selected from input by way of a dedicated termination key, or a signal input interval comprising the suspension of inputs into said computer.

* * * * *